Dec. 9, 1952         C. L. SWIFT              2,620,899
                  OVERDRIVE CONTROL DEVICE
Filed Oct. 2, 1948                        2 SHEETS—SHEET 1
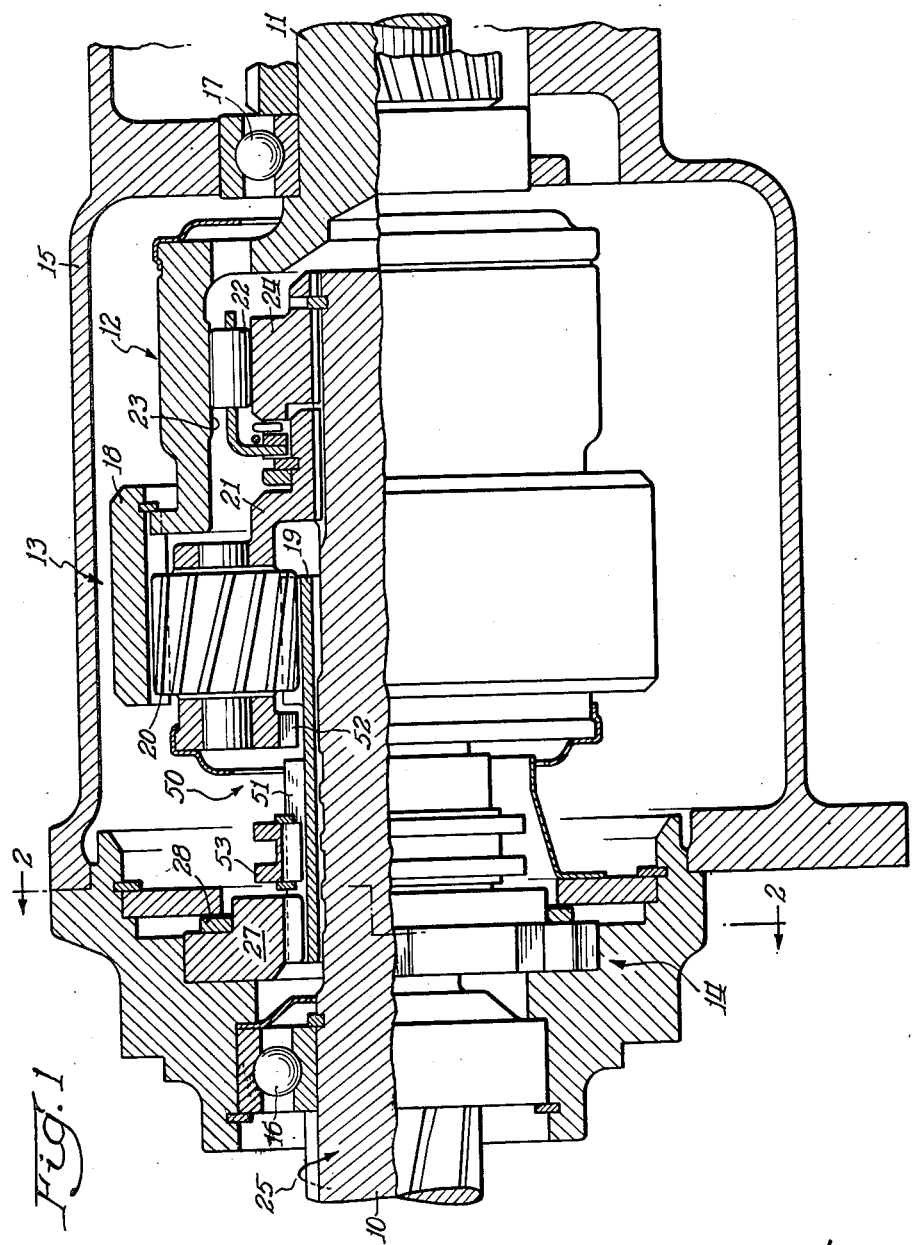
Inventor:
Clifford L. Swift Dec. 9, 1952  C. L. SWIFT  2,620,899
OVERDRIVE CONTROL DEVICE
Filed Oct. 2, 1948  2 SHEETS—SHEET 2
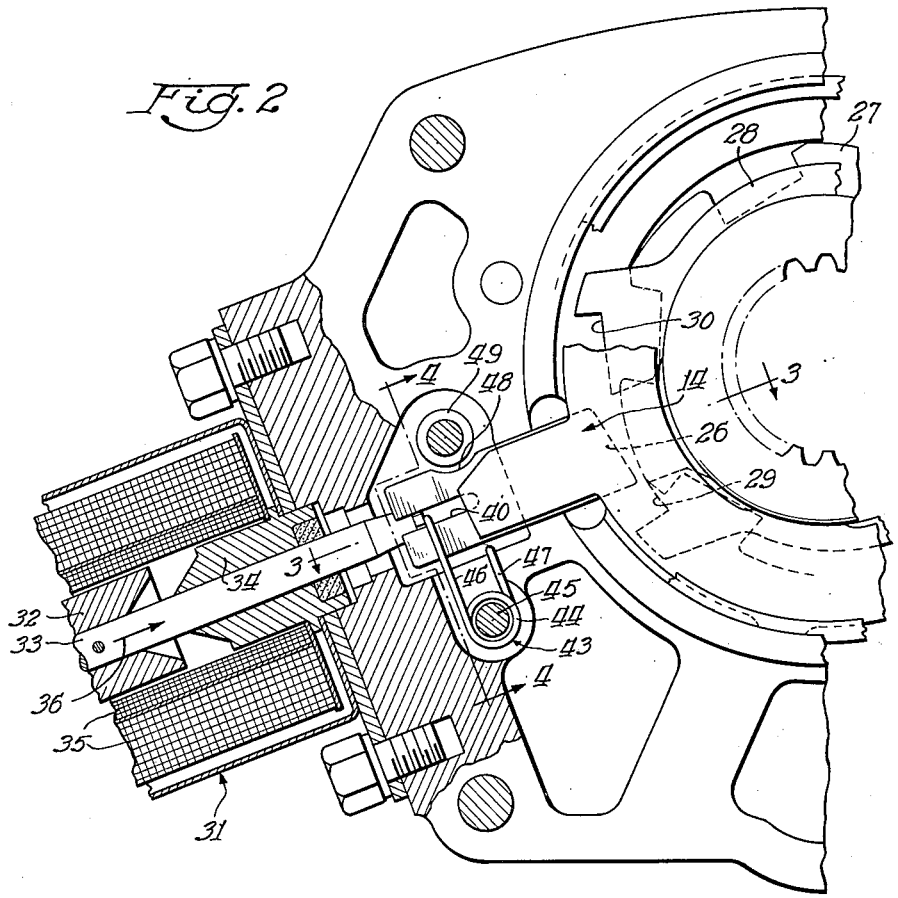
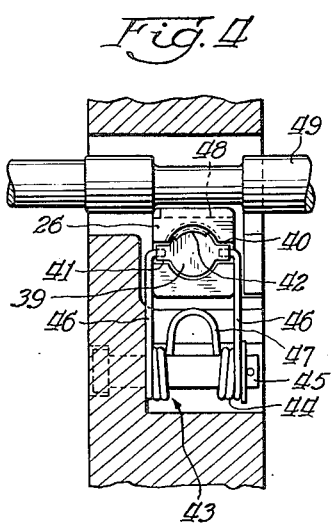
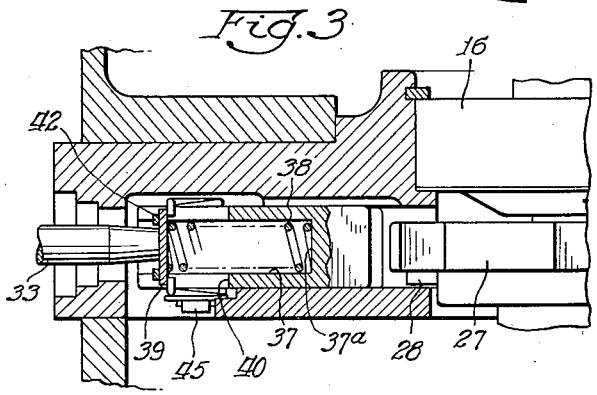
Inventor:
Clifford L. Swift Patented Dec. 9, 1952

2,620,899

UNITED STATES PATENT OFFICE 2,620,899

OVERDRIVE CONTROL DEVICE

Clifford L. Swift, Muncie, Ind., assignor to Borg-Warner Corporation, Chicago, Ill., a corporation of Illinois Application October 2, 1948, Serial No. 52,571

6 Claims. (Cl. 188—163)

My invention relates to overdrive transmissions for automotive vehicles and more particularly to motor operated pawl mechanisms for such transmissions.

In overdrive transmissions which are in use at the present time, an electric solenoid operated pawl is utilized for completing the overdrive power train. The electric solenoids comprise electric windings acting magnetically on a movable armature which is connected to the pawl, and the electric solenoids include two springs one of which is effective between the movable armature and the pawl and the other of which is effective between the armature and a part fixed with respect to the transmission case to retract the armature and pawl from their engaged overdrive positions. These springs are located in the electric solenoids at their ends remote from the pawls controlled thereby.

It is an object of my invention to provide a simplified overdrive solenoid construction including springs effective for performing the functions for the two springs just mentioned.

To this end it is an object to provide a spring between the electric solenoid and pawl which is located in a recess in the pawl.

It is a further object of the invention to provide a retractor spring effective on both the solenoid armature and the pawl disposed approximately between the solenoid and pawl instead of within the electric solenoid at its remote end. It is contemplated that this retractor spring preferably shall be of a type having a coiled portion and arms connecting the coiled portion with the electric solenoid armature and the pawl.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 1 is a diagrammatic illustration of an overdrive transmission with which my improved solenoid and pawl construction may be used;

Fig. 2 is a cross-sectional view of the overdrive transmission taken substantially on line 2—2 of Fig. 1;

Fig. 3 is a sectional view taken on line 3—3 of Fig. 2; and

Fig. 4 is a sectional view taken on line 4—4 of Fig. 2.

Like characters of reference designate like parts in the several views.

Referring now to the drawings, the illustrated overdrive transmission comprises a drive shaft 10, a driven shaft 11, a one-way roller clutch unit 12, an overdrive gear set 13 and an electric solenoid and pawl assembly 14. The shafts 10 and 11 are respectively journaled in a transmission casing 15 by means of bearings 16 and 17. The drive shaft 10 is adapted to be connected to a vehicle engine, and the driven shaft 11 is adapted to be connected to the driving road wheels of the vehicle.

The overdrive gear set 13 comprises a ring gear 18, a sun gear 19, a plurality of planet gears 20 (one being shown in the drawing) each in mesh with the sun and ring gears and a planet gear carrier 21. The planet gear carrier 21 is splined on the drive shaft 10 and the ring gear 18 is connected with the driven shaft 11, as shown.

The one-way clutch 12 comprises a plurality of rollers 22 (one being shown in the drawing) disposed between an outer cylindrical surface 23 provided in the driven shaft 11 and a hub 24 splined on to the drive shaft 10. The roller clutch 12 is of an ordinary well-known construction, and the hub 24 is provided with a cam for each of the rollers 22, so that when the shaft 10 is driven in the forward direction as is indicated by the arrow 25, the rollers 22 will engage between the cylindrical surface 23 and the cams provided on the hub 24 so as to drive the driven shaft 11 at a 1—1 speed ratio with respect to the drive shaft 10.

In accordance with well-known principles of operation of the overdrive gear set 13, the gear set is operative to drive the ring gear 18 and thereby the driven shaft 11 connected therewith at an overdrive speed ratio when the sun gear 19 is held stationary. In this case the one-way clutch 12 overruns to break the direct drive therethrough formerly existing between the shafts 10 and 11. The pawl and solenoid assembly 14 is provided for the purpose of holding the sun gear 19 stationary to provide this overspeed drive.

The solenoid and pawl assembly 14 comprises a pawl 26 slidably disposed in a portion of the casing 15. A slotted element 27 is fixed on the sun gear 19, and the pawl 26 is adapted to move into engagement with the slotted element. A balk ring 28 is disposed adjacent and in frictional contact with the slotted element 27, and the balk ring has ledges 29 and 30 which are adapted to be in the path of movement of the pawl 26 depending on the rotative position of the balk ring.

The assembly 14 comprises an electric solenoid 31 having an armature 32 movable longitudinally therethrough. A plunger 33 is fixed to the armature. The solenoid comprises a core 34 and electric windings 35 which when energized magnetize the core 34 so as to cause the armature 32 and plunger 33 to move in the direction of the arrow 36.

The pawl 26 is provided with a recess 37 therein in which a spring 38 is disposed, one end of the spring being bottomed on the end 37a of the recess 37. A plate 39 is disposed within the recess 37 so as to be slidable therein, and this plate is in contact with the other end of the spring 38 as shown. The pawl 26 has slots 40 in opposite sides thereof, and the plate 39 has ears 41 which slide through the slots 40. The armature 32 and plunger 33 function to move the pawl 26 in the direction of the arrow 36 through the intermediary of the spring 38 and the plate 39. A spring ring 42 is disposed in an appropriate internal circumferential slot within the pawl 26 and functions to limit movement of the plate 39 outwardly of the recess under the influence of the spring 38.

A retractor spring 43 is provided for yieldably holding the pawl 26, armature 32 and plunger 33 in the positions in which they are shown and for moving these parts into their illustrated positions from their operative positions. This spring comprises a coiled portion 44 disposed about a pin 45 fixed with respect to the transmission casing 15, two arm portions 46 extending into the slots 40 in the pawl 26 and an end portion 47 which is anchored with portions fixed with respect to the transmission case 15.

The pawl 26 is provided with a groove 48 therein, and an interlock rod 49 slidably disposed in the transmission case 15 is provided for interlocking with the pawl to prevent its movement out of its illustrated position under certain circumstances, and for a more detailed description of this interlock and its operation, Kenneth M. Armantrout Patent No. 2,548,761 may be referred to.

A positive clutch 50 comprising teeth 51 on the sun gear 19 and teeth 52 on the planet gear carrier 21 is provided. The teeth 51 and 52 may be engaged by rearward longitudinal movement of the sun gear 19 by means of a shift collar 53 for locking up the planet gear unit 13, so that its elements rotate together as a unit, and the driven shaft 11 is driven in a two-way 1—1 drive with respect to the drive shaft 10.

The solenoid 31 may be energized by any suitable means (not shown). When so energized, the armature 32 and plunger 33 move inwardly as indicated by the arrow 36, and the plunger acts on the plate 39 and the spring 38. If the balk ring 28 is in its position in which it is shown, the pawl 26 will be moved by means of the spring 38 into engagement with the slotted element 27. The balk ring 28 functions, however, to position either of its ledges 29 or 30 in the path of movement of the pawl 26 until there is a change of direction of rotation of the sun gear 19 and the slotted element 27 connected therewith. During drive through the one-way clutch 12, the slotted element rotates such as to move the ledge 29 into the path of movement of the pawl 26, and after energization of the solenoid 31, the vehicle engine must be decelerated so as to bring the sun gear 19 and slotted element 27 to a standstill and to rotate it slightly in the opposite direction to move the ledge 29 out of the path of movement of the pawl 26 and to bring the balk ring 28 into its illustrated non-blocking position. At this time, the spring 38 is effective to move the pawl 26 into its engaging position. It will be understood that regardless of the rotative position of the balk ring 28, the armature 32 and plunger 33 move on energization of the solenoid, and if the ring 28 is in a balking position, the spring 38 is compressed to allow this movement of the armature and plunger without corresponding movement of the pawl. As is apparent from the drawing, since the arms 46 of the spring 43 bear on the plate 41, the movement of the armature 32 upon energization of the solenoid 31 is against the action of the spring 43.

Upon deenergization of the solenoid 31, the spring 43 acts to retract both the pawl 26 and armature 32. Such retraction occurs when the drive has been sufficiently released through the overdrive unit so that the retractor spring 43 exerts sufficient force to pull the pawl 26 out of engagement with the slotted element 27 against whatever frictional resistance exists at the time between the pawl 26 and slotted element 27.

The arrangement of the springs 38 and 43 is advantageously such that no springs are required in the end of the solenoid 31 remote from the pawl 26 to return the pawl and armature back to their inoperative positions and to allow a full movement of the armature to its operative position even though movement of the pawl is blocked. The spring arrangement is furthermore such that it may be manufactured economically.

I wish it to be understood that my invention is not to be limited to the specific constructions, arrangements, and devices shown and described, except only in so far as the claims may be so limited, as it will be apparent to those skilled in the art that changes may be made without departing from the principles of the invention.

I claim:

1. In a device for controlling a toothed element of an automotive vehicle transmission, the combination of a pawl adapted to engage the toothed element, a solenoid having an armature, the pawl being formed with a recess therein, a spring seated within the recess, a plate loosely mounted in the recess and in abutting relation with said spring, and means secured to the pawl for holding said plate in said recess against the action of said spring, said armature abutting said plate and effective upon energization of said solenoid to compress said spring and thereby bias the pawl toward its engaged position.

2. In a device for controlling a toothed element of an automotive vehicle transmission, the combination of a pawl adapted to engage the toothed element, a solenoid having an armature, the pawl being formed with a recess therein, a spring seated within the recess, a plate loosely mounted in the recess and in abutting relation with said spring, means for guiding said plate in said recess, and means secured to the pawl for holding said plate in said recess against the action of said spring, said armature abutting said plate and effective upon energization of said solenoid to compress the spring and thereby bias the pawl toward its engaged position.

3. In a device for controlling a toothed element of an automotive vehicle transmission, the combination of a pawl adapted to engage the toothed element, a solenoid having an armature, the pawl being formed with a recess therein, a spring seated within the recess, said armature acting against said spring and effective upon energization of said solenoid to compress the spring and thereby bias the pawl and tend to move it toward its engaged position, and a second spring having a coil spaced from and having an axis at an angle to a line of movement of the pawl for disengaging the pawl upon deenergization of said solenoid.

4. In a device for controlling a toothed element of an automative vehicle transmission, the combination of a pawl adapted to engage the toothed element, a solenoid having an armature, the pawl being formed with a recess therein, a spring seated within the recess, a plate loosely mounted in the recess and in abutting relation with said spring, and means secured to the pawl for holding said plate in said recess against the action of said spring, said armature abutting said plate and effective upon energization of said solenoid to compress said spring and thereby bias the pawl and tend to move it toward its engaged position, and a second spring comprising a coil spaced from and having an axis at an angle to a line of movement of the pawl for disengaging the pawl upon deenergization of said solenoid.

5. In a device for controlling a toothed element of an automative vehicle transmission, the combination of a pawl adapted to engage the toothed element, a solenoid having an armature, the pawl being formed with a recess therein, a spring seated within the recess, a plate loosely mounted in the recess and in abutting relation with said spring, and means secured to the pawl for holding said plate in said recess against the action of said spring, said armature abutting said plate and effective upon energization of said solenoid to compress said spring and thereby bias the pawl toward its engaged position, and a retracting spring having a coiled portion spaced from said pawl and an arm bearing against said plate for disengaging the pawl upon deenergization of said solenoid.

6. In a device for controlling a toothed element of an automative vehicle transmission, the combination of a pawl adapted to engage the toothed element, a solenoid having an armature, a spring positioned between said pawl and said armature, said armature being effective upon energization of said solenoid to compress the spring and thereby bias the pawl and tend to move it toward its engaged position, and a second spring having a curved portion curved about an axis spaced from and at an angle to a line of movement of the pawl and having a portion extending from the curved portion for thereby rendering the second spring effective to disengage the pawl upon deenergization of said solenoid.

CLIFFORD L. SWIFT.

REFERENCES CITED

The following references are of record in the file of this patent:

UNITED STATES PATENTS

| Number | Name | Date |
|---|---|---|
| 1,499,909 | Church | July 1, 1924 |
| 2,254,115 | Claytor | Aug. 26, 1941 |
| 2,414,388 | Orr et al. | Jan. 14, 1947 |